(12) United States Patent
Yoo et al.

(10) Patent No.: US 10,334,275 B2
(45) Date of Patent: Jun. 25, 2019

(54) PANORAMIC VIEW CUSTOMIZATION

(71) Applicant: KT Corporation, Seongnam-si, Gyeonggi-do (KR)

(72) Inventors: Young-il Yoo, Seongnam-si (KR); I-gil Kim, Suwon-si (KR); Kyung-jun Lee, Seoul (KR); Sun-jong Kwon, Seoul (KR); Gyu-tae Baek, Seoul (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 353 days.

(21) Appl. No.: 14/979,829

(22) Filed: Dec. 28, 2015

(65) Prior Publication Data

US 2016/0191798 A1    Jun. 30, 2016

(30) Foreign Application Priority Data

Dec. 26, 2014    (KR) .................. 10-2014-0190609

(51) Int. Cl.
*H04N 5/232*    (2006.01)
*H04N 19/61*    (2014.01)
*H04N 19/23*    (2014.01)
*G06F 3/0485*    (2013.01)

(52) U.S. Cl.
CPC ........... *H04N 19/61* (2014.11); *G06F 3/0485* (2013.01); *H04N 19/23* (2014.11)

(58) Field of Classification Search
CPC ....... H04N 19/61; H04N 19/23; G06F 3/0485
See application file for complete search history.

(56) References Cited

U.S. PATENT DOCUMENTS

| | | | | |
|---|---|---|---|---|
| 7,227,899 | B2* | 6/2007 | Balakrishnan ... | H04N 21/23608 375/240.26 |
| 7,424,218 | B2* | 9/2008 | Baudisch ............... | G03B 13/02 348/218.1 |
| 8,155,202 | B2* | 4/2012 | Landau ............ | H04N 21/23412 375/240.03 |
| 8,264,524 | B1* | 9/2012 | Davey ................ | H04N 5/23206 345/419 |
| 9,736,454 | B2* | 8/2017 | Hannuksela ....... | H04N 13/0048 |

FOREIGN PATENT DOCUMENTS

| | | |
|---|---|---|
| KR | 10-2002-0070015 A | 9/2002 |
| KR | 10-2007-0061145 A | 6/2007 |
| KR | 10-2012-0058763 A | 6/2012 |

* cited by examiner

*Primary Examiner* — Tsion B Owens
(74) *Attorney, Agent, or Firm* — Hamre, Schumann, Mueller & Larson, P.C.

(57) ABSTRACT

Panoramic view customization may include dividing a panoramic video frame into multiple blocks, encoding the multiple blocks, generating and storing synchronization information and location information corresponding to the multiple blocks, receiving, from a device, information that identifies a viewing area of interest in the panoramic video frame, identifying at least two of the blocks that include at least some of the information that identify the viewing area of interest, combining the identified blocks to frame a first video; and transmitting the first framed video to the device.

15 Claims, 7 Drawing Sheets

PANORAMIC VIEW CUSTOMIZATION

BACKGROUND

Panoramic video images are obtained by capturing multi-directional, i.e., 360 degree, still and/or video images. A panoramic video image can then be produced by geometrically calibrating and spatially composing images taken by one or more cameras.

A panoramic video can maximize a viewer's level of immersion and sense of realism, having gained wider use since the implementation of UHD (Ultra High Definition) video.

SUMMARY

In accordance with at least one example embodiment, a method associated with at least portions of panoramic view customization may include dividing a panoramic video frame into multiple blocks, encoding the multiple blocks, generating and storing synchronization information and location information corresponding to the multiple blocks, receiving, from a device, information that identifies a viewing area of interest in the panoramic video frame, identifying at least two of the blocks that include at least some of the information that identify the viewing area of interest, combining the identified blocks to frame a first video; and transmitting the first framed video to the device.

In accordance with at least one other example embodiment, an apparatus for transmitting video may include: a frame manager to divide a panoramic video frame into multiple blocks, an encoder to encode the multiple blocks, a block data manager to generate synchronization information and location information corresponding to the multiple blocks, a database to store the generated synchronization information and location information, a receiver to receive, from a device, information that identifies a viewing area of interest in the panoramic video frame, a database manager to identify at least two of the blocks that include at least some of the information that identify the viewing area of interest, an output frame manager to combine the identified blocks to frame a first video; and a transmitter to transmit the first framed video to the device.

In accordance with yet another example embodiment, a device for playing video may include: a transmitter to transmit, to an apparatus, information identifying a first viewing area of interest in a panoramic video frame; a receiver to receive a first video; a decoder to decode the received first video; and a display to display the decoded first video, the panoramic video being divided into multiple blocks, the multiple blocks are encoded, and the first video being generated by combining at least two of the blocks of the panoramic video frame that correspond to the first viewing area of interest.

BRIEF DESCRIPTION OF THE DRAWINGS

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

DETAILED DESCRIPTION

In accordance with any one of the above-described exemplary embodiments, a panoramic video image and/or panoramic video image frame may be segmented into multiple segmented regions, images in the respective segmented regions may be encoded, and an image corresponding to a region of viewing interest in the panoramic video may be transmitted to a requesting device. Further, the device may dynamically identify the region of viewing interest, periodically transmitting information that identifies the most recent region of viewing interest.

Thus, only the portion of the panoramic video image and/or panoramic video image frame that includes the identified region of viewing interest is sent to the requesting device, the transmission thereof being a high-resolution framed panoramic video. As an example, panoramic video having a resolution of at least 4K-bits, can be viewed on devices that would not ordinarily be able to process and/or display high-resolution panoramic view videos.

Further, a panoramic video image and/or panoramic video image frame may be segmented into multiple segmented regions and encoded. When a segmented image corresponding to an identified region of viewing interest corresponding to the panoramic video is transmitted to a device, the encoding burden on a corresponding server may be reduced.

As referenced herein, a panoramic video or panoramic video frame may refer to video images or a compilation of still images that typically include an assembly or stitching of multiple images encompassing anywhere from 180 to 360 degrees from the perspective of the image capturing device or devices.

Since a video file is comprised of a number of still images per unit of time of video, a video frame, as referenced herein, may refer to any of such still images or plurality of such still images within a particular unit of time needed to provide a realistic illusion of a moving image.

Figure 1:
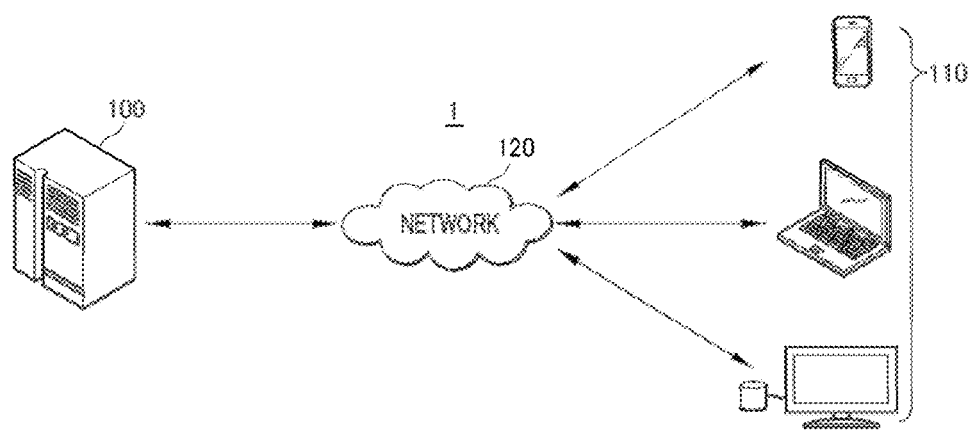
FIG. 1 shows a system by which at least portions of panoramic view customization may be implemented, in accordance with at least one example embodiment described herein.

FIG. 1 shows a system by which at least portions of panoramic view customization may be implemented, in accordance with at least one example embodiment described herein. System 1 may include a video server 100 for region of interest, a device 110, and a network 120.

Video server 100 may refer to a server or other computing device that is capable of capturing, receiving and/or storing panoramic video files and/or panoramic video streams. Video server 100 may be implemented as a network-attached storage, a personal computer that runs a video sharing application capable of processing high-resolution video files or streams, a commercial web server, etc. Video server 100 is implemented with sufficient bandwidth to receive and transmit, at least, high-resolution panoramic video files or streams, in accordance with contemporary resolution requirements.

Device 110 may refer to at least one of a mobile phone, a smart phone, a portable device, a notebook, a personal computer or a personal communication terminal. Non-limiting examples of such devices may include PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminals.

As referenced herein, device 110 may be a requesting device that sends or transmits a request for at least a portion of a panoramic video. In accordance with some embodiments, device 110 may not be fully capable of displaying an entire panoramic video. Thus, a user may utilize device 110 to send or transmit, to server 100, a request that includes information that identifies at least one portion of a panoramic video file or panoramic video stream. The identified portion may include a framed segment of the panoramic view included in the video file or video stream.

Video server 100 may receive, encode, and/or store panoramic video files and panoramic video streams. Video server 100 may be configured, programmed, and/or designed to segment a panoramic video frame, which may include any number of still images within a particular unit of time needed to provide a realistic illusion of a moving image, into multiple segmented regions. By way of example, video server 100 for region of interest may segment a panoramic video image into segmented images each having a size of 320×216 pixels. Video server 100 may encode the panoramic video files or video streams, either prior to or subsequent to segmenting the panoramic video frames into the multiple segmented regions or blocks.

Video server 100 may further be configured, programmed, and/or designed to store synchronization information and location information of the images of the respective encoded segmented regions. The synchronization information may include PTS (Presentation Time Stamp) information or PCR (Program Clock Reference) information. The location information may include location information and indexes regarding respective ones of the multiple segmented regions, relative to the entire panoramic video image or frame. The location information may be represented by X- and Y-coordinates, though such example is not prohibitive of other means of identifying a location of a respective one of the segmented regions or blocks.

As set forth above, video server 100 may receive information that identifies a viewing region of interest, relative to a panoramic video or stream, from the device 110. Details thereof will be described with reference to FIG. 2 below.

Figure 2:
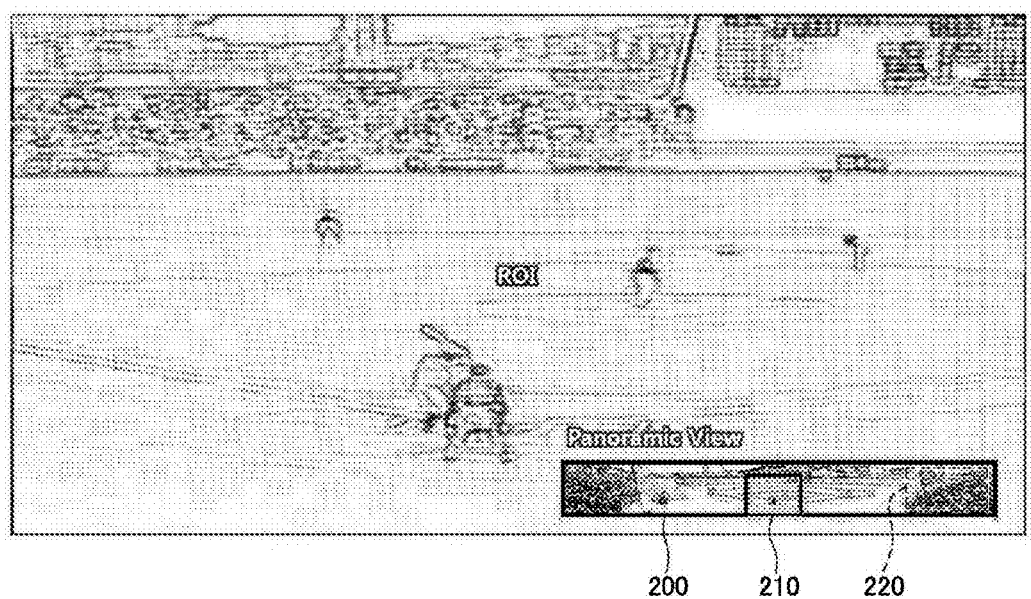
FIG. 2 shows a panoramic video frame and viewing areas of interest, in accordance with at least one example embodiment described herein.

FIG. 2 shows a panoramic video frame and viewing areas of interest, in accordance with at least one example embodiment described herein. As a non-limiting example, panoramic video image or frame 200 is shown as a sub-window. A viewing region of interest 210, is shown as a sub-image of panoramic video 200 and the entirety of the screen, identified as "RIO" (Region of Interest). The panoramic video 200 illustrated in the example of FIG. 2 is that of a baseball game, having stitched together multiple images from one or more cameras. The region of viewing interest 210 corresponds to a central part of the baseball field where a pitcher and batter are seen.

Another region of viewing interest 200, which may be dynamically identified by a user of device 110, may include a view 220 from the right field stands.

With regard to FIG. 1, information regarding the region of viewing interest received by video server 100 from device 110 may include location information of an image corresponding to the region of viewing interest. The location information of the image of the region of interest may be represented by X- and Y-coordinates. For example, if the region of interest is a square region, location information of the region of viewing interest may include X- and Y-coordinates at an upper left end of the square and X- and Y-coordinates at a lower right end of the square, thus framing the region of viewing interest.

Video server 100 may be configured, programmed, and/or designed to search for one or more segmented regions or blocks corresponding to the information that identifies the region of viewing interest, using the location information, or using the synchronization information and location information of the images of the respective stored segmented regions or blocks. For example, video server 100 may search among the stored segmented regions or blocks for those that include at least one of the X- and Y-coordinates included in the location information of the region of viewing interest received from the device 110.

Video server 100 may send images that are identified as including at least a portion of the location information of the viewing region of interest to device 110. Thus, for example, video server 100 may send, to device 110, a wider region than the region corresponding to the X- and Y-coordinates identified in the location information of the viewing region of interest received from the device 110, since the segments or blocks that include at least one of the X or Y coordinates may be identified as matching.

Further, video server 100 may stitch the matched or identified images into a single image. Video server 100 may then send or transmit the composed single image to device 110.

As such, since just a single image is transmitted or sent to device 110, device 110 just the single image, and thus does not need multiple decoders.

Device 110 may then output or display the image of the first region of viewing interest received from server 100, thus display a framed portion of a high-resolution panoramic video image.

Device 110 may dynamically and periodically change the viewing region of interest. When the user of device 110 wants to change the viewing region of interest, device 110 may transmit or send information that identifies a new or second region of interest to video server 100.

Device 110 may receive a framed video corresponding to the second viewing region of interest from video server 100 after identifying the new or second region of interest to video server 100.

The device 110 may then output or display either of the decoded first viewing region of interest or the decoded second viewing region of interest.

Network 120 refers to a connection structure that enables information exchange between nodes such as server 100 and devices 110. Examples of network 120 may include the Internet, LAN (Local Area Network), Wireless LAN (Wireless Local Area Network), WAN (Wide Area Network), PAN (Personal Area Network), 3G, 4G, LTE, Wi-Fi (Wireless Fidelity), WiMAX (World Interoperability for Microwave Access), WiGig (Wireless Gigabit), or the like, but is not limited thereto.

Figure 3:
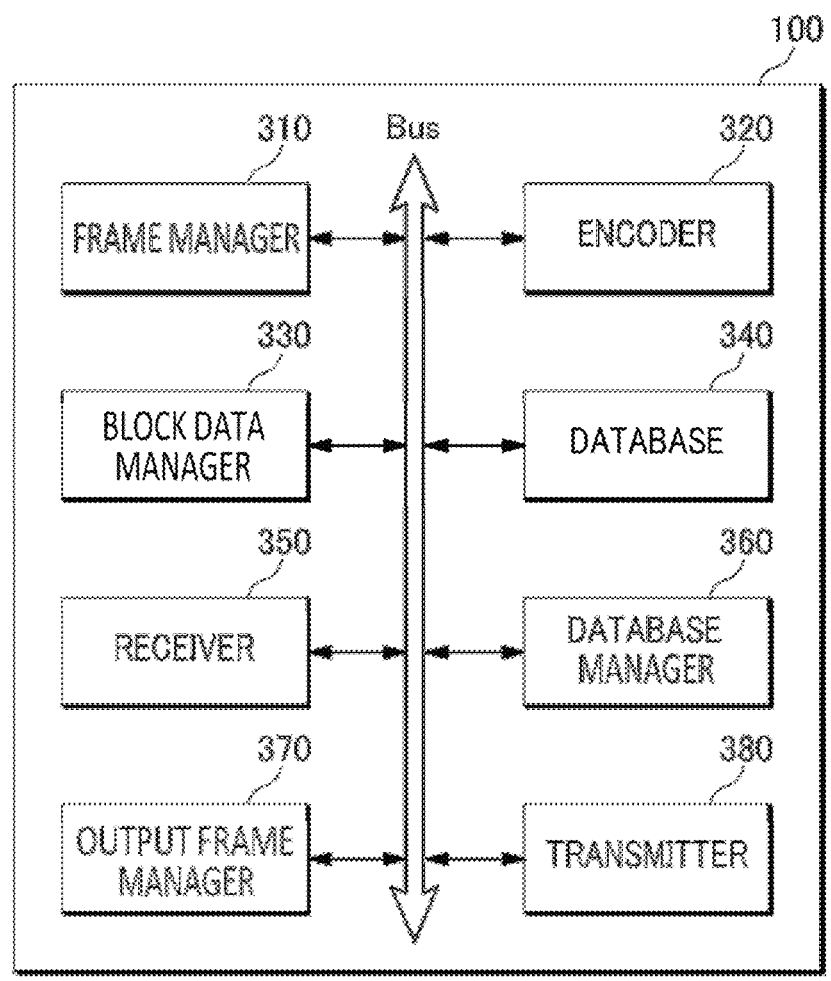
FIG. 3 is a block diagram of an apparatus utilized to implement at least portions of panoramic view customization, in accordance with at least one example embodiment described herein.

FIG. 3 is a block diagram of an apparatus utilized to implement at least portions of panoramic view customization, in accordance with at least one embodiment described herein. Referring to FIG. 3, video server 100 may include a frame manager 310, an encoder 320, a block data manager 330, a database 340, a receiver 350, a database manager 360, an output frame manager 370, and a transmitter 380. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. These components may be implemented in a computing environment relative to video server 100, and may be stored in a corresponding memory storage device. For purposes of illustration, the application or program, including executable program components, are illustrated herein as discrete blocks, although it is recognized that such programs and components reside at various times in different storage components of the corresponding client device, and may be executed by at least one data processor of the computer.

Frame manager 310 may be configured, programmed, and/or designed to segment a panoramic video image into multiple segmented regions or blocks. By way of example, frame manager 310 may segment a panoramic video image into segmented images each having a size of 320×216 pixels.

Frame manager 310 may be configured, programmed, and/or designed to divide one or more frames of a received or stored panoramic video into multiple segments or blocks.

Encoder 320 may be configured, programmed, and/or designed to encode respective ones of the segments or blocks produced by frame manager 310.

Block data manager 330 may be configured, programmed, and/or designed to generate synchronization information and/or location information corresponding to respective ones of the segments or blocks.

Database 340 may be configured, programmed, and/or designed to store the generated synchronization information and location information for the respective segments or blocks. The synchronization information may include PTS (Presentation Time Stamp) information or PCR (Program Clock Reference) information. The location information may be location information about the multiple segmented regions, and may include indexes and location information of the respective segmented regions in the panoramic video image. By way of example, the location information may be represented by X- and Y-coordinates.

Receiver 350 may be configured, programmed, and/or designed to receive, from one or more of devices 110, information that identifies a viewing region of interest in the received or stored panoramic video. Thus, it follows that, as a user of any one of devices 110 changes or updates the viewing area of interest receiver 350 receives information that identifies that new area of viewing interest. The location information may be represented by X- and Y-coordinates. For example, if the region of interest is a square region, location information of the region of interest may include X- and Y-coordinates at an upper left end of the square and X- and Y-coordinates at a lower right end of the square.

Database manager 360 may be configured, programmed, and/or designed to search for and/or identify at least two of the segments or blocks that include at least some of the information that may identify any identified viewing area of interest using, at least, the location information. For example, database manager 360 may search among images of one or more segmented regions corresponding to the X- and Y-coordinates as the location information of the image of the region of interest received from the device 110.

Output frame manager 370 may be configured, programmed, and/or designed to combine or stitch together the identified segments or blocks that may correspond to the identified viewing area of interest. The combined segments or blocks frame a portion of the panoramic video, resulting in a framed video or video image corresponding to the identified viewing area of interest.

As referenced herein, segments or blocks of a panoramic video or video image may be combined or stitched together by aligning segments or blocks of a panoramic video or video image spatially.

Output frame manager 370 may be further configured, programmed, and/or designed to generate headers, each respectively corresponding to one or more of the segments or blocks of the divided panoramic video. The generated headers may include one or more of location information and size information of the images of the segmented regions, respectively. Thus, output frame manager 370 may combine or stitch together at least two of the multiple headers that respectively correspond to the identified segments or blocks that, themselves, correspond to the viewing area of interest.

Output frame manager 370 may be further configured, programmed, and/or designed to determine that a flexible macroblock ordering (FMO) scheme may be available to the device 110 that has identified the viewing area of interest, e.g., with the panoramic video being received or stored as an FMO stream. Thus, output frame manager 370 may be combined or stitched together at least two of the identified segments or blocks using the FMO scheme.

FMO refers to a technology of segmenting an image into multiple regions and encoding the segmented regions independently from each other.

FMO is a technology of segmenting an image into multiple regions and encoding the segmented regions, and is capable of suppressing propagation of an error occurring in a certain slice to other slices. As for a slice group according to FMO, multiple rectangular slice groups may be designated and the rest may be designated as a background slice group. In other words, FMO is defined in the H.264/AVC standard. Since FMO segments an image into multiple regions and encoded the segmented regions, it is possible to suppress occurrence of an error between the regions. According to FMO, multiple rectangular slice groups may be designated and the rest may be designated as a background slice group. A slice group may be included in multiple rectangular slice groups according to Foreground/Leftover type of FMO. Each slice group may be each segmented region of a segmented panoramic video image. The slice group may include multiple macroblocks.

If device 110 does not support the FMO technology, output frame manager 370 may combine images of one or more segmented regions into a single image without using the FMO technology. By way of example, output frame manager 370 may combine images of one or more segmented regions by rearranging the multiple macroblocks included in a slice group in the same order as decoded by device 110.

Transmitter 380 may be configured, programmed, and/or designed to transmit the first framed video, or video image, to device 110. The transmitted image may be wider than the region that corresponds to the X- and Y-coordinates received from device 110.

Since the single image is sent to device 110, device 110 performs a decoding process once on the single image and thus does not need multiple decoders.

Figure 4:
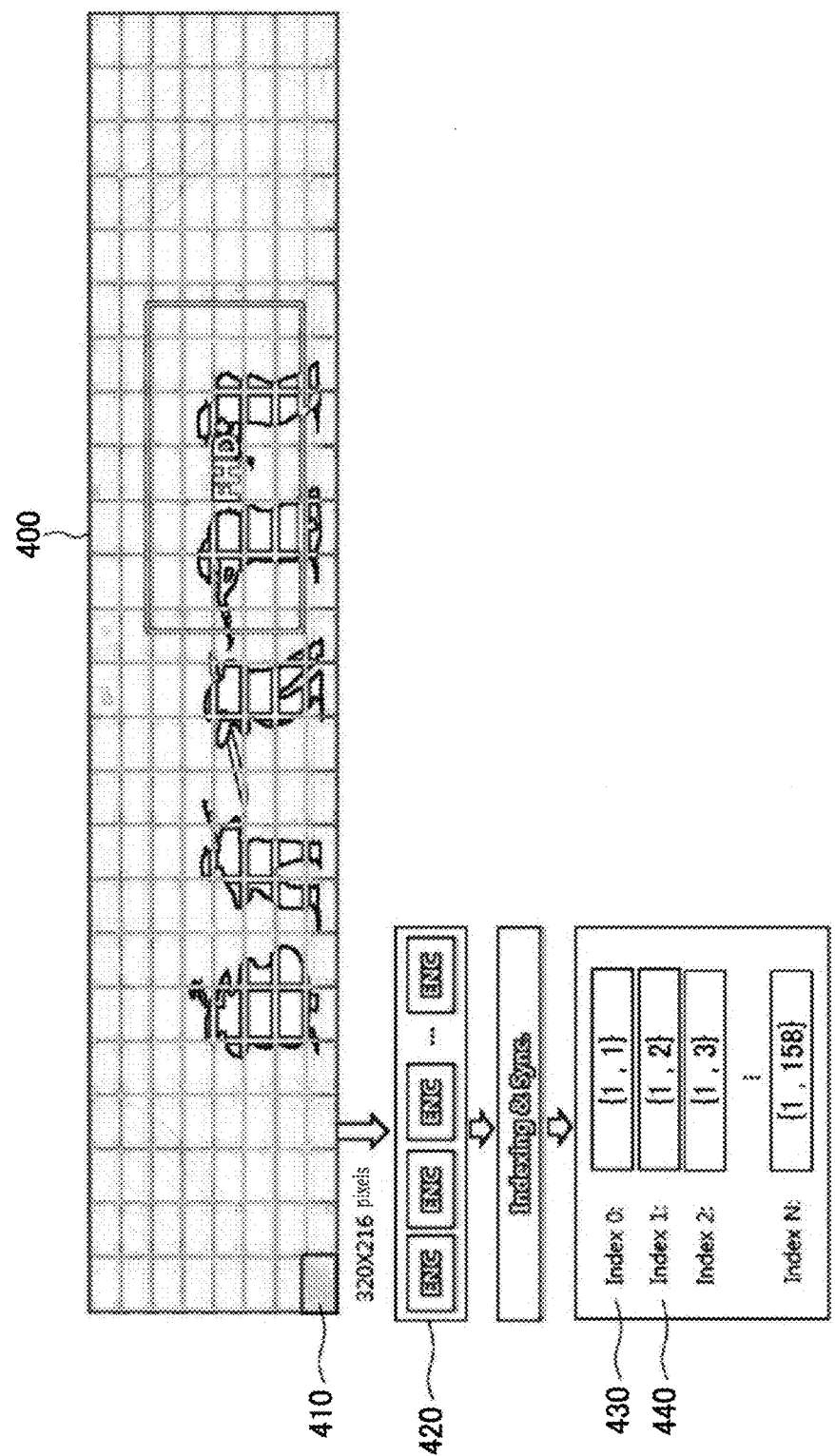
FIG. 4 shows a panoramic video frame that has been divided into multiple blocks for, at least, encoding, in accordance with at least one example embodiment described herein.

FIG. 4 shows a panoramic video frame that has been divided into multiple blocks for, at least, encoding, in accordance with at least one other example embodiment described herein.

A panoramic video frame 400 may be divided into multiple blocks 410 each having a predetermined size. For example, blocks 410 may be 320×216 pixels.

Blocks 410 may be encoded by encoders 420. The encoded blocks may be synchronized and may have location information that may be stored and/or associated with the respective encoded blocks in a header thereof. By way of example, an encoded block 430 with Index 0 may have an X-coordinate of 1 and a Y-coordinate of 1. Further, an encoded block with Index 1 may have an X-coordinate of 1 and a Y-coordinate of 2.

Figure 5:
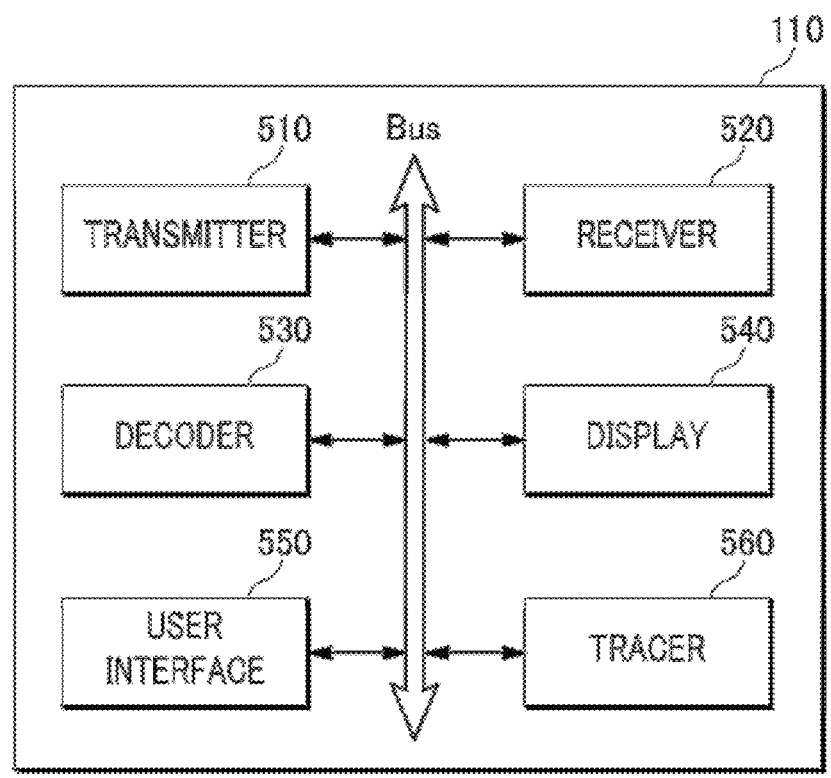
FIG. 5 is a block diagram of an apparatus to implement at least portions of panoramic view customization, in accordance with yet another example embodiment described herein.

FIG. 5 is a block diagram of an apparatus to implement at least portions of panoramic view customization, in accordance with yet another example embodiment described herein. Referring to FIG. 5, one or more of devices 110 may include a transmitter 510, a receiver 520, a decoder 530, a display 540, a user interface 550, and a tracer 560. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. These components may be implemented in a computing environment relative to device 110, and may be stored in a corresponding memory storage device. For purposes of illustration, the application or program, including executable program components, are illustrated herein as discrete blocks, although it is recognized that such programs and components reside at various times in different storage components of the corresponding client device, and may be executed by at least one data processor of the computer.

Transmitter 510 may be configured, programmed, and/or designed to transmit, to video server 100, information identifying a first viewing area of interest in a panoramic video frame.

Receiver 520 may be configured, programmed, and/or designed to receive a video file or video stream from video server 100.

Decoder 530 may be configured, programmed, and/or designed to decode the received video file or video stream.

Display 540 may be configured, programmed, and/or designed to display the decoded video file or video stream.

User interface (UI) 550 may be configured, programmed, and/or designed to receive an input of viewing area of interest on the panoramic video frame.

Tracer 560 may be configured, programmed, and/or designed to trace, or track, a change in the viewing area of interest.

If the region of interest is changed, tracer 560 may send information about a new or updated region of viewing interest to video server 100. The second region of interest may be a region of interest changed from the first region of interest being already output.

The information regarding the new or updated region of viewing interest may include indexes and location information of the respective segmented regions in the panoramic video image. As an example, the location information may be represented by X- and Y-coordinates.

Figure 6:
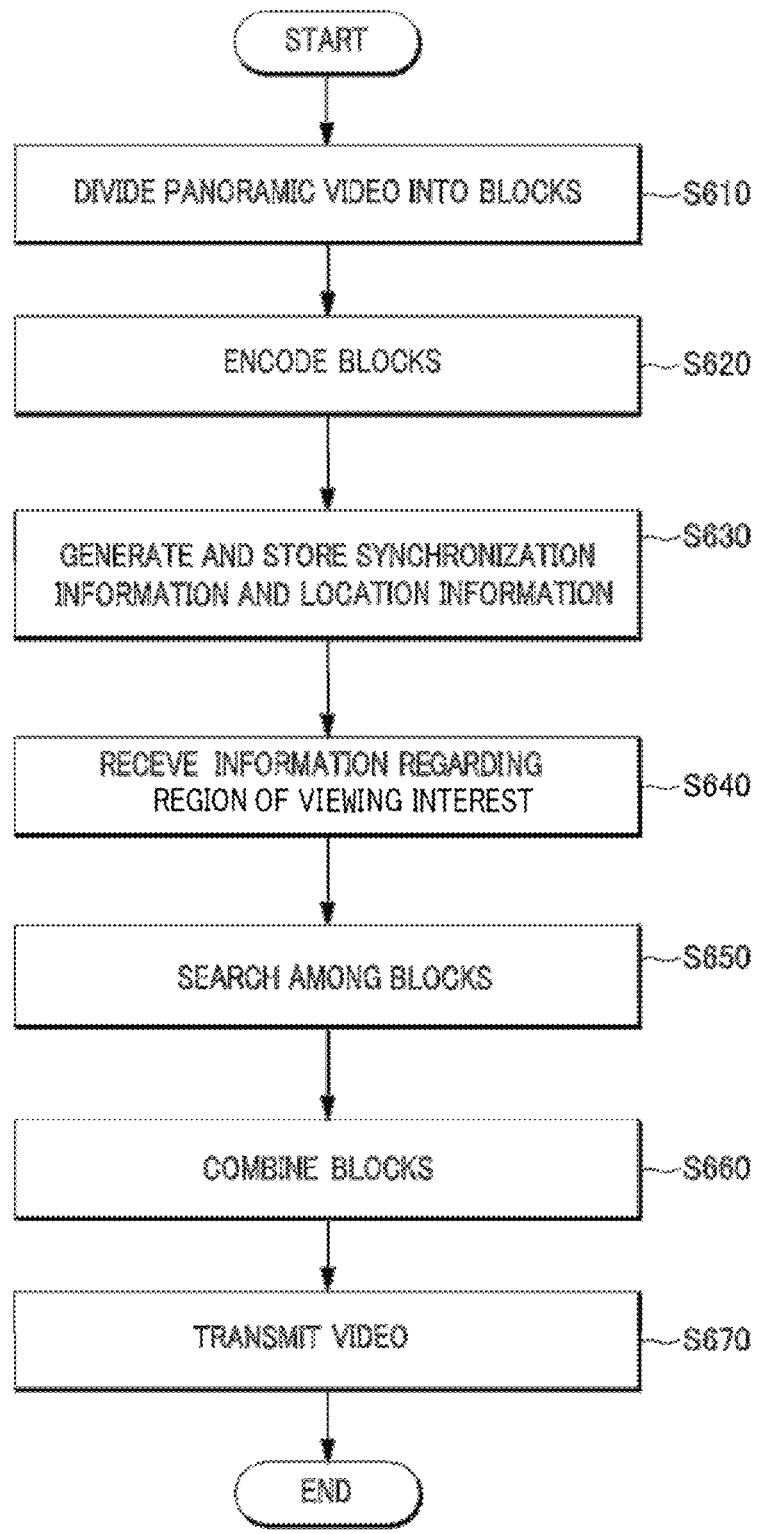
FIG. 6 is data flow diagram for implementing at least portions of panoramic view customization, in accordance with at least one example embodiment described herein.

FIG. 6 data flow diagram for implementing at least portions of panoramic view customization, in accordance with at least one example embodiment described herein. As depicted, the processing flow may include sub-processes executed by various components that are part of video server 100 or devices 110. However, the processing flow is not limited to such components, and modification may be made by re-ordering two or more of the sub-processes described here, eliminating at least one of the sub-processes, adding further sub-processes, substituting components, or even having various components assuming sub-processing roles accorded to other components in the following description. The processing flow may include various operation, functions, or actions as illustrated by one or more of blocks S610, S620, S630, S640, S650, S660, and/or S670. Processing may begin at S610.

S610 (Divide Panoramic Video Into Blocks) may refer to frame manager 310 dividing one or more frames of a received or stored panoramic video into multiple segments or blocks. Processing may proceed from block S610 to block S620.

S620 (Encode Blocks) may refer to encoder 320 encoding respective ones of the segments or blocks produced by frame manager 310. Processing may proceed from block S620 to block S630.

S630 (Generate and Store Synchronization Information and Location Information) may refer to block data manager 330 generating synchronization information and/or location information corresponding to respective ones of the segments or blocks. Processing may proceed from block S630 to block S640.

S640 (Receive Information Regarding Region of Viewing Interest) may refer to database 340 receiving and storing the generated synchronization information and location information for the respective segments or blocks. As stated previously, the synchronization information may include PTS information or PCR information. The location information may be location information about the multiple segmented regions, and may include indexes and location information of the respective segmented regions in the panoramic video image.

S640 may further refer to receiver 350 receiving, from one or more of devices 110, information that identifies a viewing region of interest in the received or stored panoramic video. As a user of any one of devices 110 changes or updates the viewing area of interest receiver 350 receives information that identifies that new area of viewing interest.

The location information may be represented by X- and Y-coordinates. Thus, per an example set forth above, if the region of interest is a square region, location information of the region of interest may include X- and Y-coordinates at an upper left end of the square and X- and Y-coordinates at a lower right end of the square. Processing may proceed from block S640 to block S650.

S650 (Search Among Blocks) may refer to database manager 360 searching for and/or identifying at least two of the segments or blocks that include at least some of the information that may identify any identified viewing area of interest using, at least, the location information. Thus, database manager 360 may search among images of one or more segmented regions corresponding to the X- and Y-coordinates as the location information of the image of the region of interest received from the device 110.

S660 (Combine Blocks) may refer to output frame manager 370 stitching or combining the identified segments or blocks that may correspond to the identified viewing area of interest. Additionally or alternatively, output frame manager 370 may combine or stitch together at least two of the multiple headers that respectively correspond to the identified segments or blocks that, themselves, correspond to the viewing area of interest. The combining, or stitching, may be in accordance with FMO technology if the panoramic video is stored as an FMO stream.

S670 (Transmit Video) may refer to transmitter 380 transmitting the combined or stitched video to device 110.

Figure 7:
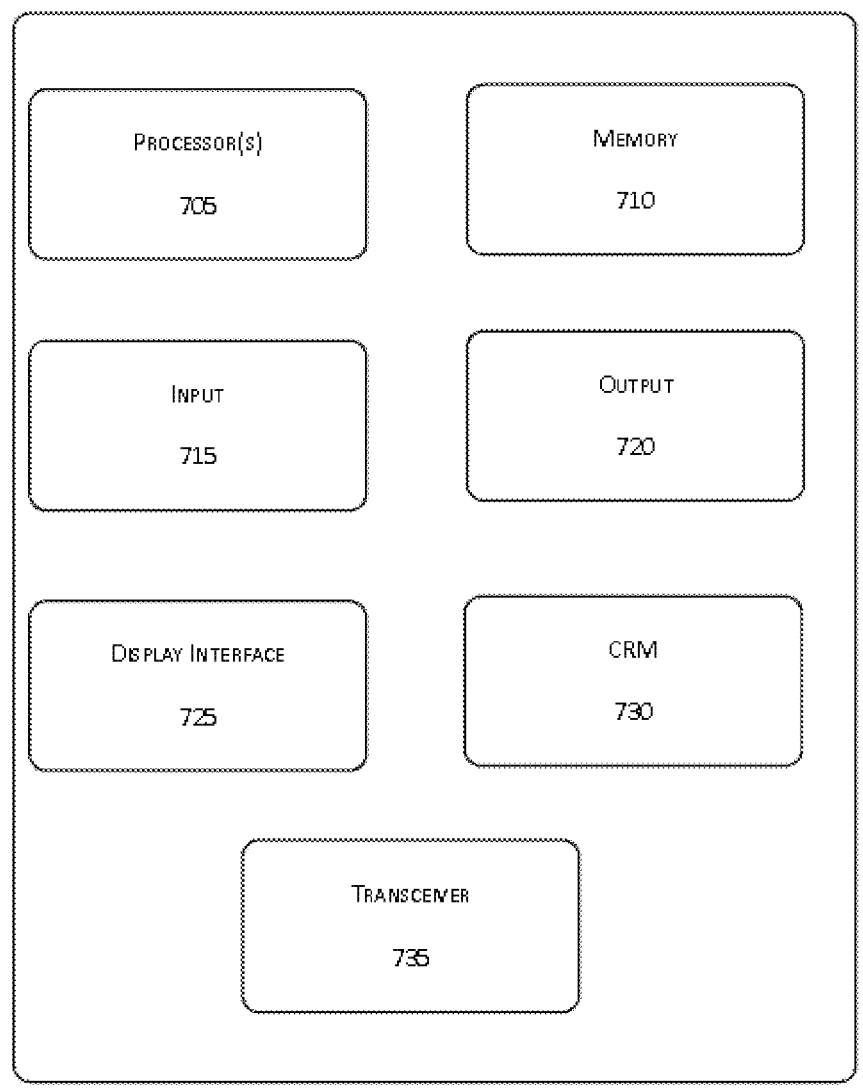
FIG. 7 shows an example computing device on which and by which at least portions of panoramic view customization may be implemented, arranged in accordance with one or more embodiments described herein.

FIG. 7 shows an illustrative computing embodiment, in which any of the processes and sub-processes of panoramic view customization may be implemented as computer-readable instructions stored on a computer-readable medium. The computer-readable instructions may, for example, be executed by a processor of any one of video server 100 and/or devices 110, as referenced herein, having a network element and/or any other device corresponding thereto, particularly as applicable to the applications and/or programs described above corresponding to the configuration 700 for panoramic view customization.

In a very basic configuration, a computing device 700 may typically include, at least, one or more processors 705 and a system memory 710. Computing device 500 may also include one or more input components 715, one or more output components 720, a display component 725, a computer-readable medium 730, and a transceiver 735.

Processor(s) 705 may refer to, e.g., a microprocessor, a microcontroller, a digital signal processor, or any combination thereof.

Memory 710 may refer to, e.g., a volatile memory, non-volatile memory, or any combination thereof. Memory 710 may store, therein, an operating system, an application, and/or program data. That is, memory 710 may store executable instructions to implement any of the functions or operations described above and, therefore, memory 710 may be regarded as a computer-readable medium.

Input component 715 may refer to a built-in or communicatively coupled keyboard, touch screen, or telecommunication device. Further, an input component, if not built-in to computing device 700, may be communicatively coupled thereto via short-range communication protocols including, but not limited to, radio frequency or Bluetooth.

Output component 720 may refer to a component or module, which may be built-in or removable from computing device 700, which is configured to output data to an external device.

Display component 725 may refer to, e.g., a solid state display that may have touch input capabilities. That is, a display component may include capabilities that may be shared with or replace those of the aforementioned input components.

Computer-readable medium 730 may refer to a separable machine readable medium that is configured to store one or more programs that embody any of the functions or operations described above. That is, a computer-readable medium, which may be received into or otherwise connected to a drive component of computing device 700, may store executable instructions to implement any of the functions or operations described above. These instructions may be complimentary or otherwise independent of those stored by memory 710.

Transceiver 735 may refer to a network communication link for computing device 700, configured as a wired network or direct-wired connection. Alternatively, a transceiver may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method performed by a video server, comprising:
   dividing all regions of a panoramic video frame into multiple segmented regions;
   encoding respective ones of all the multiple segmented regions;
   generating and storing synchronization information and location information corresponding to the respective ones of all the multiple segmented regions;
   after the encoding, receiving, from a device, information that identifies a viewing area of interest in the panoramic video frame;
   identifying at least two of the multiple segmented regions that include at least some of the information that identify the viewing area of interest using the location information;
   combining the at least two of the identified segmented regions to frame a first video; and
   transmitting the first framed video to the device.

2. The method of claim 1, further comprising:
   receiving, from the device, information that identifies a second viewing area of interest;
   identifying at least two of the multiple segmented regions that include at least some of the information that identify the second viewing area of interest using the location information;
   combining the at least two of the identified segmented regions that include at least some of the information that identify the second viewing area of interest to frame a second video; and
   transmitting the second framed video to the device.

3. The method of claim 1, wherein the combining includes:
   generating multiple headers, each corresponding to a respective one of the multiple segmented regions and including at least one of the synchronization information and the location information,
   combining at least two of the multiple headers corresponding to the at least two of the identified segmented regions.

4. The method of claim 1, wherein the combining includes:
  determining that an FMO (Flexible Macroblock Ordering) scheme is available to the device,
  wherein the first video is configured as an FMO stream, and
  wherein the combining includes combining the at least two identified segmented regions into the first framed video by using FMO scheme.

5. The method of claim 1, wherein the combining is executed using a video stitching scheme.

6. The method of claim 1, wherein the location information includes x-y coordinates on the panoramic video frame.

7. An apparatus for transmitting a video, comprising:
  a frame manager configured to divide all regions of a panoramic video frame into multiple segmented regions prior to an encoding process;
  an encoder configured to encode respective ones of all the multiple segmented regions;
  a block data manager configured to generate synchronization information and location information corresponding to respective ones of all the multiple segmented regions;
  a database configured to store the generated synchronization information and location information;
  a receiver configured to receive, from a device, information that identifies a viewing area of interest in the panoramic video frame after the encoding;
  a database manager configured to identify at least two of the multiple segmented regions that include at least some of the information that identify the viewing area of interest using the location information;
  an output frame manager configured to combine the at least two identified segmented regions to frame a first video; and
  a transmitter configured to transmit the first framed video to the device.

8. The apparatus of claim 7, wherein:
  the receiver is further configured to receive, from the device, information that identifies a second viewing area of interest,
  the database manager is further configured to identify at least two of the multiple segmented regions that include at least some of the information that identify the second viewing area of interest based on the location information,
  the output frame manager is further configured to combine the at least two of the identified segmented regions that include at least some of the information that identify the second viewing area of interest to frame a second video, and
  the transmitter is further configured to transmit the second framed video to the device.

9. The apparatus of claim 7, wherein the output frame manager is further configured to:
  generate multiple headers, each corresponding to a respective one of the multiple segmented regions and including at least one of the synchronization information and the location information; and
  combine at least two of the multiple headers corresponding to the at least two of the identified segmented regions.

10. The apparatus of claim 7, wherein the output frame manager is further configured to:
  determine that an FMO scheme is available to the device,
  wherein the first video is configured as an FMO scheme; and
  combine the at least two identified segmented regions into the first framed video by using FMO scheme.

11. The apparatus of claim 7, wherein the output frame manager is further configured to combine the at least two identified segmented regions into the first framed video by using video stitching technology.

12. The apparatus of claim 7, wherein the location information includes x-y coordinates on the panoramic video frame.

13. A device for playing video, comprising:
  a transmitter configured to transmit, to an apparatus, information identifying a first viewing area of interest in a panoramic video frame;
  a receiver configured to receive a first video;
  a decoder configured to decode the received first video; and
  a display configured to display the decoded first video,
  wherein all regions of the panoramic video is divided into multiple segmented regions, respective ones of all the multiple segmented regions are encoded, and the first video is generated by combining at least two of the multiple segmented regions of the panoramic video frame that correspond to the first viewing area of interest.

14. The device of claim 13, further comprising
  a user interface configure to receive an input of viewing area of interest on the panoramic video frame; and
  a frame tracker configured to track a change of the viewing area of interest, and
  wherein if the viewing area of interest changes, the transmitter transmit, to the apparatus, information identifying a second viewing area of interest.

15. The device of claim 14, wherein the receiver is further configured to receive, from the apparatus, a second video that is generated by combining at least two of the multiple segmented regions of the panoramic video frame corresponding to the second viewing area of interest, and
  the display is further configured to display the second viewing area of interest.

* * * * *